Webster & Ladd.
Bed Bottom.
No. 3,295. Reissued Feb. 9, 1869.
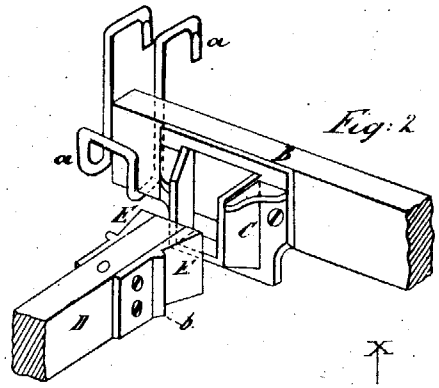
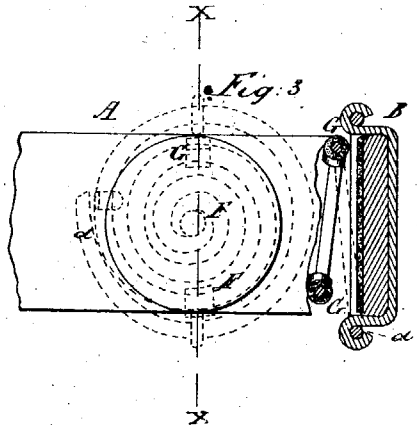
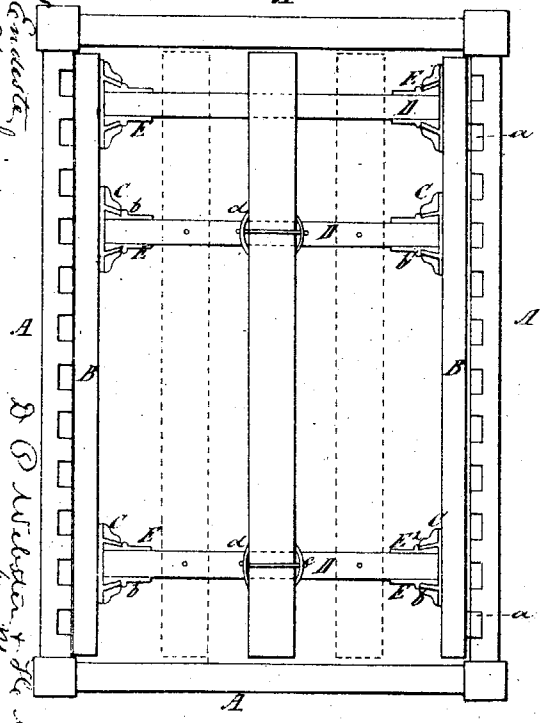
Witnesses
Jos. L. Endeste,
John A. Riedershein
Inventors
D. P. Webster & H. W. Ladd
by Munn & Co
per J. Knight United States Patent Office.

DEXTER P. WEBSTER AND HERMAN W. LADD, OF BOSTON, MASSACHUSETTS.

*Letters Patent No.* 64,175, *dated April* 23, 1867; *reissue No.* 3,295, *dated February* 9, 1869.

IMPROVED SPRING-BED BOTTOM.

The Schedule referred to in these Letters Patent and making part of the same.

*To all whom it may concern:*

Be it known that we, DEXTER P. WEBSTER and HERMAN W. LADD, of the city of Boston, county of Suffolk, and State of Massachusetts, have invented certain new and useful Improvements in Spring-Bed Bottoms; and we do hereby declare the following to be a full, clear, and exact description of the nature thereof, sufficient to enable others skilled in the art to which it appertains, to make and use the same, reference being had to the accompanying drawings, making part of this specification, in which—

Figure 1 is a top or plan view of our invention.

Figure 2 is a perspective view, showing the connecting parts of the frame and the pendent support.

Figure 3 is a top or plan view of a spring and protecting-cushion.

Figure 4 is a transverse vertical section of the spring, in the line *x x*, fig. 3.

Our invention has for its object the production of a frame, for supporting the spring-slats, which can readily be taken apart and easily refitted, without screws, nails, or like devices, and admitting of great portability, and are intended to be hung or suspended upon pendent hooks secured to the bedstead-frame.

It further consists in the application of flexible cushions on the coils, whereby all noise or jarring is prevented when the slats are depressed and the springs compressed; all as will be hereinafter more fully described.

A, fig. 1, represents the ordinary side and end-pieces of a bedstead, having pendants, *a*, on which the frame rests. These pendants consist of a wire, first bent into U-shape, then the two opposite ends turned into loops pointing in opposite directions. The ends of the upper loop, constituting the two ends of the wire, have sharp cutting-edges, so that they can be driven into the frame of the bedstead at suitable places. The lower loop receives and holds the pieces B of the slat-frame. When the hooks are in position, the frame supporting the springs and slats is suspended within the bedstead-frame, at a height equal therewith.

B are the two side-pieces of the frame, of ordinary construction, and of the length of the side-pieces of the bedstead.

On their inner side, at regular intervals, there are secured dovetail brackets, C, which are adapted to receive the dovetailed ends of the cross-pieces D, which, when secured therein, retain the frame firmly in position, without any other mode of securing or fastening.

To the end of each cross-piece D, on both sides, there are secured plates E, having a bead or shoulder, *b*, on their faces, at the middle, and from this shoulder the plates gradually increase in thickness, forming one side of a dovetailed point. This bead acts as a guide in introducing the ends of the cross-pieces into the brackets, and assists in forming a more perfect joint.

The cross-pieces may have their ends cut of a corresponding form; but, as the wood may warp, or, in washing them, become wet, and then not readily enter the brackets, we prefer the plates, for their cost is but little and their utility great.

In putting the frame together, the two side-pieces are set upright, and the ends of the cross-pieces fitted into the brackets, and pressed downward to their full extent, when all parts will be firmly held in position, independently of any other mode of fastening.

The cross-pieces are pierced to receive the ends of the springs *d*, which bear the slats.

Only two cross-pieces are necessary, but we employ a third one near the end, which will be at the foot of the bed, so that if any one rests or sits thereon, the weight will be brought directly on this lower piece, and thus prevent the breaking or snapping of the slats.

In taking the bed apart, the slats and springs are first removed, then the cross and side-pieces separated, and thus all parts can be readily made in one bundle, and in suitable condition for transportation.

To the lower side of each slat, within the space surrounded by the upper or larger coil of the spring, we secure, by cementing or otherwise, a flexible pad, F. This pad may be made of rubber, felt, cloth, or other fabric, and is intended to prevent noise when the coils strike the slats, when the latter is depressed.

To still further attain this object, we secure on the coils, above the one to which the wire clamp C is attached, rubber cushions G. These cushions consist of sections of tubes, which can be slipped over the coils of the springs to their position, and are readily removed when desired.

When the coils are compressed by the depression of the slats, the cushion on the first coil will strike the flexible pad F, the cushion of the next coil will likewise strike the pad, but its opposite side will strike the cushion of the first coil, and thus all noise will be deadened, and the coils and slats act entirely noiseless.

The simplicity of this device is apparent. The slats and springs can be readily cleaned, vermin can find no resting-place, no noise is made, and the frame can be easily taken apart and put together again.

We are aware that pierced cross-bars, and a third cross-bar, have been used in spring-beds, when attached directly to the side-rails of the bedstead. Our object is to combine them with side-rails, or a box independent of bedstead, so as to form a frame complete in itself; also to be readily united, and to hold its several parts together, and prevent it from spreading laterally, by interlocking its several parts without the use of screws, nails, or other like devices.

In case the spring-bottom is narrower than the bedstead, it cannot separate; and for hotels it will be found advantageous, when extra beds are required, as they can be placed upon the floor or supports, and answer all practical purposes of an extra bedstead. They are very convenient for dealers, as they are readily fitted together. Any person unaccustomed to such articles can readily fit them up, without the use of tools, screws, nails, or like devices.

The pendent hooks are very convenient, as by their use we are enabled to suspend the spring-bottom as low as parties may fancy, as they can be made of any length, and are particularly useful on cottage, windlass, or rope bedsteads, when, without them, the spring-bottom would naturally be placed upon the bedstead, slats, or other corresponding devices, which support the bedding, thereby raising the bedding the extra height of the spring-bottom.

We prefer to bend the wire, as described herein, as it answers for the object sought, and the cost is small. Bars or sheets of metal could be bent, so as to rest upon the rails of the bedstead, and support the spring-bed frame, but we prefer the wire, as its cost is less.

To prevent vermin collecting in and around the cushions or pads, we first saturate them with a solution of corrosive sublimate or other poison, or else mix the same with the paste or cement by which they are attached to the slat.

Having thus described our invention,

What we claim as new, and desire to secure by Letters Patent, is—

1. A detachable frame, having spring-supporting cross-bars, interlocking with side-bars, in such a manner that the side-bars shall support the ends of the cross-bars, and at the same time prevent the side-pieces from separating laterally, or in line with the cross-bars, without any other fastening, as set forth.

2. Cross-bars D, having plates E, constructed substantially as and for the purpose described, or their ends cut, so as to form a section of an interlocking-joint.

3. The third or safety-bar D, in combination with side-bars B and spring-slats, substantially as and for the purpose described.

4. The removable sectional tubular cushions G, applied to the coils of the springs, substantially as described, for the purpose specified.

5. The pendent hooks *a*, constructed substantially as described, in combination with the bedstead-frame A, supporting the slat-bearing frame, substantially as and for the purpose set forth.

6. The combination of the longitudinal slats, conical springs, and the detachable frame, substantially as and for the purpose set forth.

The above, signed by us, this 7th day of December, 1868.

H. W. LADD.
D. P. WEBSTER.

Witnesses:
CHAS. H. LOVELAND,
GEO. T. ANGELL.